United States Patent [19]

Ochs

[11] Patent Number: 4,703,688

[45] Date of Patent: Nov. 3, 1987

[54] SANDWICH-FILLING APPARATUS

[76] Inventor: Jean Ochs, 4 Residence Gabriel Peri, Champigny-sur-Marne, France

[21] Appl. No.: 833,874

[22] Filed: Feb. 25, 1986

[30] Foreign Application Priority Data

Feb. 25, 1985 [FR] France ................................ 85 03243
Jan. 8, 1986 [FR] France ................................ 86 00455

[51] Int. Cl.⁴ .............................................. A23L 1/00
[52] U.S. Cl. .................................. 99/450.8; 99/450.4; 99/494; 99/532
[58] Field of Search .................... 99/494, 450.4, 450.1, 99/450.6, 450.7, 450.8, 532, 533; 17/42.1, 35; 426/283, 92, 143; 425/114, 404

[56] References Cited

U.S. PATENT DOCUMENTS

| | | | |
|---|---|---|---|
| 390,170 | 9/1888 | Humaston | 99/494 |
| 774,394 | 11/1904 | Peter | 99/494 |
| 2,784,682 | 3/1957 | Clevenger | 99/494 X |
| 2,822,571 | 2/1958 | Johnson | 425/404 X |
| 4,162,333 | 7/1979 | Nelson et al. | 99/494 X |
| 4,178,660 | 12/1979 | Olney et al. | 99/532 X |
| 4,414,885 | 11/1983 | Kelly | 99/532 X |

Primary Examiner—Timothy F. Simone
Attorney, Agent, or Firm—Karl F. Ross; Herbert Dubno; Andrew Wilford

[57] ABSTRACT

A flowable filling is placed in a piece of bread to make a sandwich by first blocking the front end of a tube extending along a longitudinal axis and having a rear end axially behind the front tube end and then filling the tube behind the blocked front end with a mass of the filling. Subsequently a piston is provided to close the rear end of the tube behind the mass and the filled tube is poked into the piece of bread. The filled tube is then withdrawn from the piece of bread while holding the piston nondisplaceable and unblocking the front end of the tube so that the filling is left in the bread. The tube is of a diameter smaller than that of the piece of bread and is normally at least as long as the piece of bread. The front end is normally pointed so it can be poked into the bread to form its own hole.

17 Claims, 14 Drawing Figures

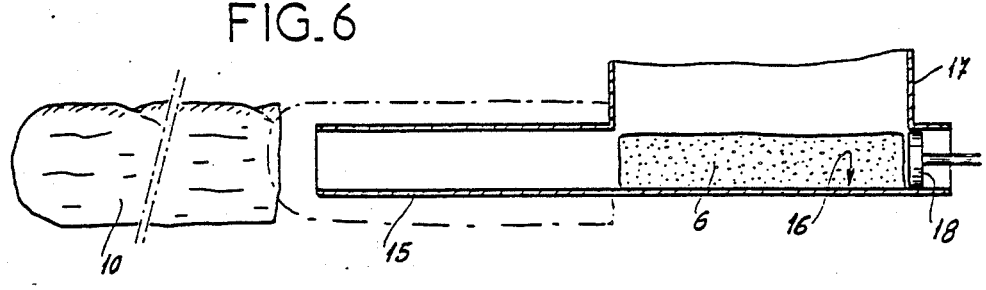
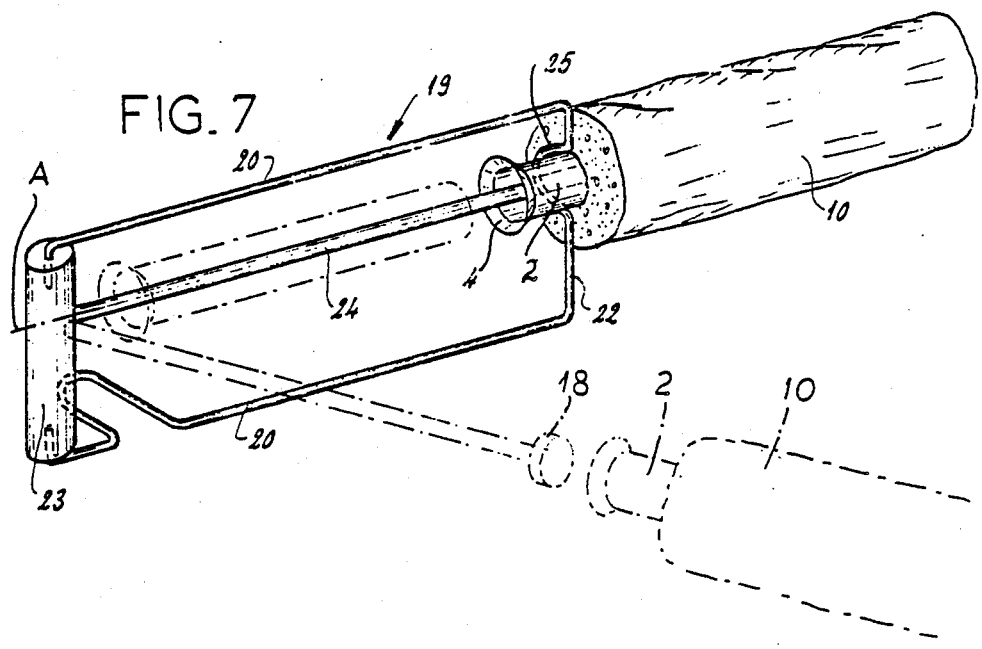

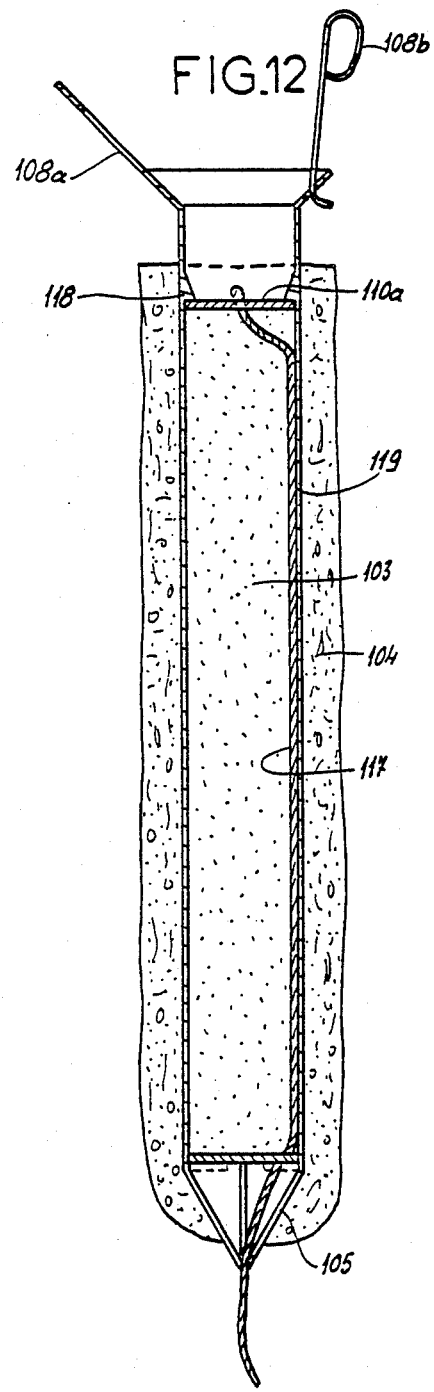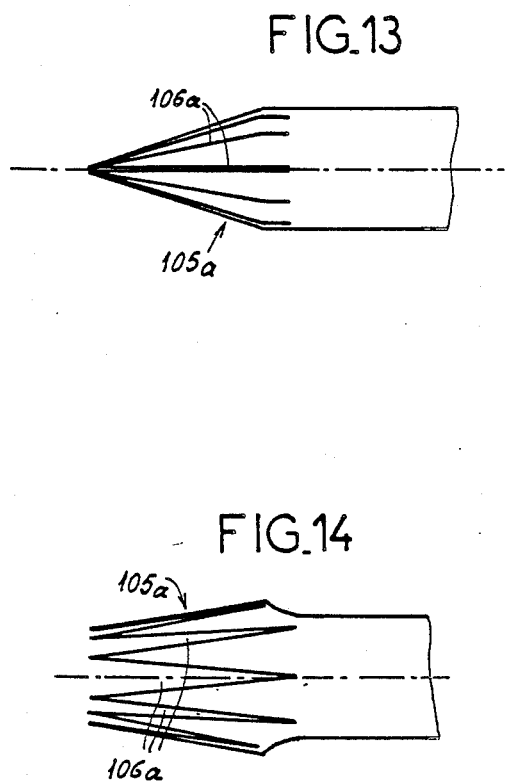

SANDWICH-FILLING APPARATUS

FIELD OF THE INVENTION

The present invention relates to an apparatus for making sandwiches. More particularly this invention concerns the application of the filling to the bread.

BACKGROUND OF THE INVENTION

A sandwich, the classic and perhaps original fast food, comprises a filling which can be meat, jelly, salad, or virtually any other substance one would not normally eat with the hands, encased in bread so that the combination can be eaten neatly. The bread can either be in the form of two discreet slices between which the filling is held, or a single elongated piece such as of the pita or French type that forms a pocket to hold the filling.

In spite of the many different mixtures or materials usable as fillings, the actual making of a sandwich represents a major bottleneck in the production of this style of food, which otherwise is very suitable as a fast food. Most sandwich fillings are wet and flowable, so that the sandwiches cannot be prefilled without making the bread soggy. Because of this and because different consumers want different sandwich garnishes, it is standard to make up sandwiches as they are ordered, something which requires experienced personnel if portions are to be uniform and quality high. Furthermore, if a certain filling should be heated, the purveyor must either keep a supply hot, which runs the risk of overcooking or otherwise ruining it, or heating up the individual batch, which further slows the transaction.

OBJECTS OF THE INVENTION

It is therefore an object of the present invention to provide an improved method of and apparatus for making a sandwich.

Another object is the provision of such a method of and apparatus for making a sandwich which overcomes the above-given disadvantages, that is which allows an individual batch of filling to be applied rapidly and efficiently to the bread and which also permits individual batches to be heated rapidly.

SUMMARY OF THE INVENTION

According to this invention a flowable filling is placed in a piece of bread to make a sandwich by first blocking the front end of a tube extending along a longitudinal axis and having a rear end axially behind the front tube end and then filling the tube behind the blocked front end with a mass of the filling. Subsequently a piston is provided to close the rear end of the tube behind the mass and the filled tube is poked into the piece of bread. The filled tube is then withdrawn from the piece of bread while holding the piston nondisplaceable and unblocking the front end of the tube so that the filling is left in the bread. The tube is of a diameter smaller than that of the piece of bread and is normally at least as long as the piece of bread.

The filling can be something hot like chili or something cold like egg salad. Hot fillings can be heated up directly in the tube, which can be made of a synthetic resin, cardboard, or metal and can be of circular or polygonal section.

According to this invention the means for plugging the front end can be a forwardly pointed cap that is tightly fitted over the front tube end. It can also be a plug of edible material fitted tightly in the front tube end. The piston is formed with at least one axially throughgoing pore so that the piston can be pushed axially forward in the tube after filling of same with air trapped between the piston and the filling escaping through the pore. This piston can be edible, or can be inedible like the tube, in which latter case it is not left in the bread.

The front end of the tube of this invention is forwardly pointed. This allows the tube to form its own hole easily in the crumb of the piece of bread, keeps the filling in place during storage, and serves as a front end stop for the piston's forward travel. In addition the rear end of the tube is rearwardly flared like a funnel so that this rear end can serve for pulling back the tube and for filling the tube. The tube is formed with lateral perforations so that pressures created by cooking can be relieved through these perforations. These perforations are at at least one of the ends of the tube. Thus these perforations allow the filling to be vacuum packed if desired.

The rear end of the tube of this invention is outwardly flared and this tube is used with an accessory comprising a frame having one end formed with a seat engageable around the tube ahead of and bearing axially back on the flared rear end and an opposite end axially behind the one end and forming a transverse pivot and a rod having a front end carrying the piston and a rear end secured to the pivot. The rod is pivotal on the frame between a position lying on the axis with the piston in a tube in the seat and a position extending at an angle to the axis with the piston remote from the seat. Thus the rod is pivoted into this angled-out position, the piston is fitted into the rear end of the filled tube, and then the tube and rod are pivoted to fit the tube in the seat so that the tube can be pulled back out past the stationary rod and piston with the front frame end bearing axially forward on the bread.

The front end of the tube of this invention is forwardly pointed and formed with longitudinal splits separating it into sections and allowing the front end to open. The rear end is provided with a handle ring. In addition the tube is provided with a tight forwardly closed casing surrounding it snugly axially in front of the piston and over the front end. This casing complementarily fits over the front tube end and has a rear end attached to the tube. Such a casing allows the contents of the tube to be heated up in boiling water without actually contacting this water, and keeps such contents contained and sanitary.

According to a further feature of this invention the tube is formed with a laterally open longitudinal slot and the piston has a pusher projecting radially from the tube through the slot. A pair of outwardly projecting and longitudinally extending lips flank and define the slot. This slot has sides and regions where its sides are spaced angularly alternating with regions where its sides bear resiliently angularly on each other.

The tube can also be formed inside its rear end with a sawtooth ridge having a forwardly facing perpendicular flank bearing axially forward on the piston. A flexible cord extending forward out of the tube through the front end thereof has an end attached to the piston. Thus the tube can be poked completely through the piece of bread, the end of the cord grasped to arrest the piston, and then the tube pulled back out, leaving its contents behind in the bread.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 5 and 6 represent an accessory for use with the first embodiment of FIGS. 1 through 3;

FIG. 7 is a side view of another accessory for use with, for example, the first embodiment of FIGS. 1 through 3;

FIG. 12 is an axial section through a fourth embodiment of this invention; and

FIGS. 13 and 14 are detail views of an alternative tip for the apparatus of this invention.

SPECIFIC DESCRIPTION

Figure 1:
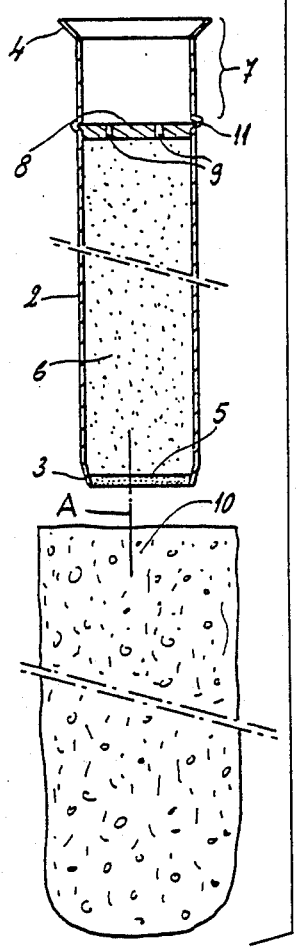
FIGS. 1, 2, and 3 are axial sections through a first embodiment of the sandwich-filling apparatus of this invention in successive stages of a sandwich-filling operation.
Figure 2:
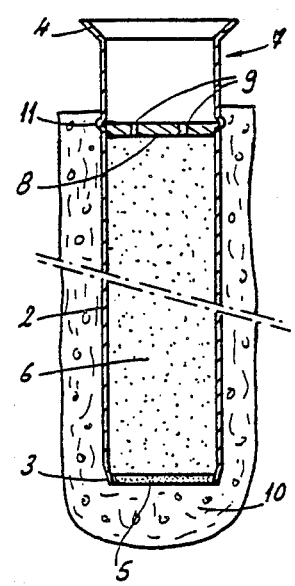
Figure 3:
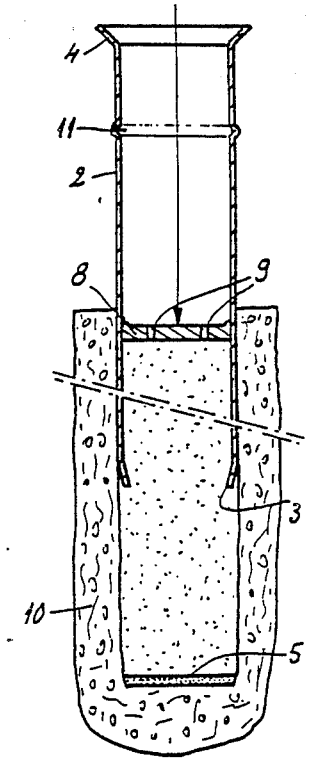

As seen in FIGS. 1 through 3 an apparatus according to this invention basically comprises a cylindrical tube 2 of a rigid or semirigid cleanable material such as stainless steel centered on and extending longitudinally front-to-back along an axis A. The tube 2 has an inwardly and forwardly tapered front end 3 formed as an inner frustoconical lip and an outwardly and rearwardly flared rear end 4 formed as an outer frustoconical lip. The front end 3 is closed by a transverse plug disk 5 of an edible material and behind this plug 5 the tube 2 is filled with a mass 6 of a fluent sandwich filling which can include solid pieces and which can be of the type eaten hot or cold. Another disk plug 8 formed with tiny holes 9 is fitted in an inwardly open groove 11 formed in the rear end portion of the tube 2, leaving an empty space 7 having a length equal to about one-quarter of that of the entire tube 2.

The thus filled and plugged tube 2 is then thrust axially into a single piece 10 of bread as seen in FIG. 2, pushing its way through the soft interior crumb of the bread to form a pocket therein. Then as indicated in FIG. 3 the tube 2 is withdrawn while the rear plug 8 is pushed forward, maintaining its position relative to the bread 10 and forcing the filling mass 6 out the front end of the tube 2.

Figure 4:
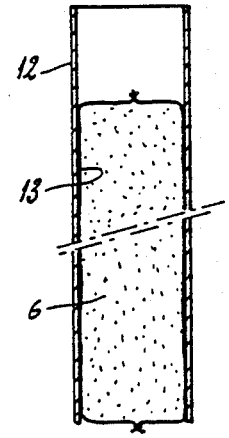
FIG. 4 is an axial section through a second embodiment according to this invention.

The arrangement of FIG. 4 uses a tube 12 that is not tapered or flared at either end. In addition the filling mass 6 is contained in a casing or envelope 13 of edible material.

Figure 5:
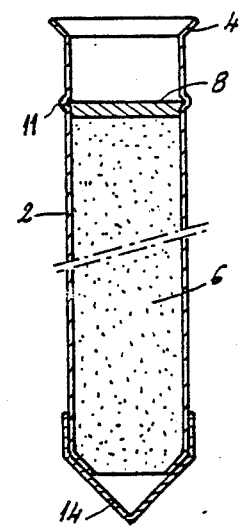
Figure 8:
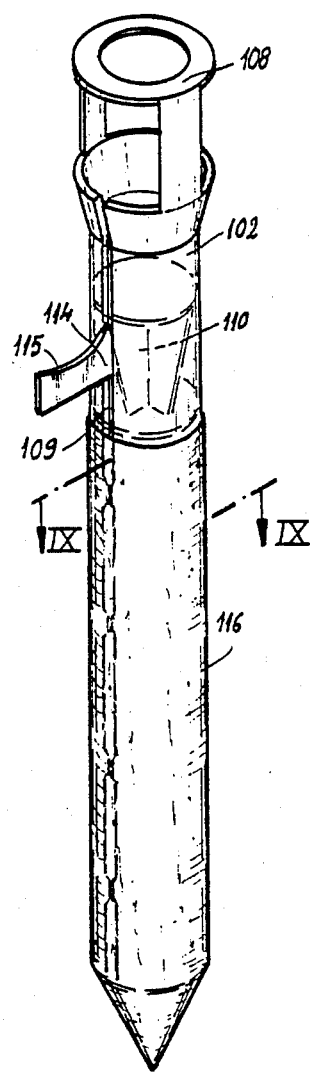
FIG. 8 is a side view of a third embodiment of the invention.
Figure 9:
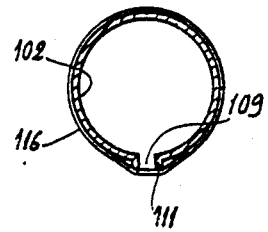
FIG. 9 is a section taken along the transverse plane indicated at IX—IX in FIG. 8.

FIG. 5 shows how a conical tip 14 can be force-fitted over the front end 2. This tip 14 is useful for particularly hard bread. It can be pushed all the way through the bread and pulled off the tube end, or can be used to form the hole, after which the tube 2 is retracted, the tip 14 removed, and the tube 2 reinserted for filling as described above.

FIG. 6 shows a tube 15 identical to the tube 12 of FIG. 4, but formed on a stationary supply vessel 16 formed with a hopper 17 and provided with a piston 18 that can move through this vessel 16 and the tube 15. For the first half of its rear-to-front stroke from the rear position seen in FIG. 6, the piston 18 pushes a batch 6 of the filling from the vessel 16 and in the second half of its stroke it pushes this mass 6 out the front end of the tube 15. Such a device is particularly handy in a delicatessen for large-volume work.

In FIG. 7 an accessory 19 is shown which comprises a pair of wire frame arms 20 diametrally flanking the axis A and interconnected at their front ends with a straight bight 22 formed with a seat 25 for the tube 2 and at their rear ends by a pivot handle 23 extending diametrally through the axis A. A shaft 24 can extend forward along the axis from the pivot 23 and carries at its front end a piston like the piston 18.

In use the filled tube 2 is inserted in the bread 10 as in FIGS. 1 through 3. Then the piston 18 is fitted into the rear end of the tube 2, to which end the rod 24 must be pivoted out as shown in dot-dash lines. Then the tube 2 is fitted to the seat 25 and the tube 2 is pulled axially back, as also indicated in dot-dash lines. The front bight 22 resists backward movement of the bread 10 and the piston 18 similarly resists backward movement of the rear plug 8, which might even be dispensed with, so that the filling is automatically left in the sandwich. This device is also particularly useful in a busy sandwich shop or the like as it allows even relatively inexperienced workers to operate the equipment perfectly.

Figure 10:
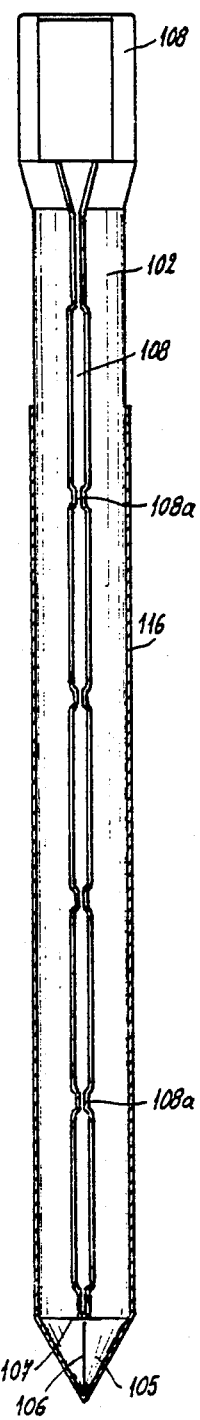
FIG. 10 is an axial section through the apparatus of FIGS. 8 and 9.

In the arrangement of FIGS. 8 through 11 a cylindrical tube 102 is adapted to contain a mass 103 of sandwich filling to be placed in a piece 104 of bread. The tube 102 has a conical tip 105 formed with longitudinal and transverse slits 106 and 107 permitting this tip 105 to open up. The rear end of the tube 102 is enlarged and provided with a handle ring 108, and the tube 102 is formed with a lateral split 109 extending from the tip 105 to the rear-end flared part. As seen in FIG. 10 this split 109 is formed by wide regions 108 separated by narrow regions 108a where the lips 111 forming the split 109 normally abut. Thus these regions 108a hold the split 109 open at the regions 108.

A plug 110 has identical front and rear disks 112 separated by a web structure 113 and provided with a lateral projection 114 forming a pusher surface 115. In addition the entire tube 102 and its tip 105 is covered axially ahead of the plug 110 by a flexible sleeve 116 of a shape complementary to that of the tube 102. This sleeve 116 is used to hold the filling 103 in the tube 102 before it is to be injected into the bread 104 and is normally loosely adhered at its open rear end. The sleeve 116 may extend back all the way around the ring 108, in which case the projection 114 is made flexible or the piston 110 is not inserted until the last minute. The casing 116 can hermetically seal the entire package and can allow it to be heated up in boiling water without getting water into the filling.

Figure 11:
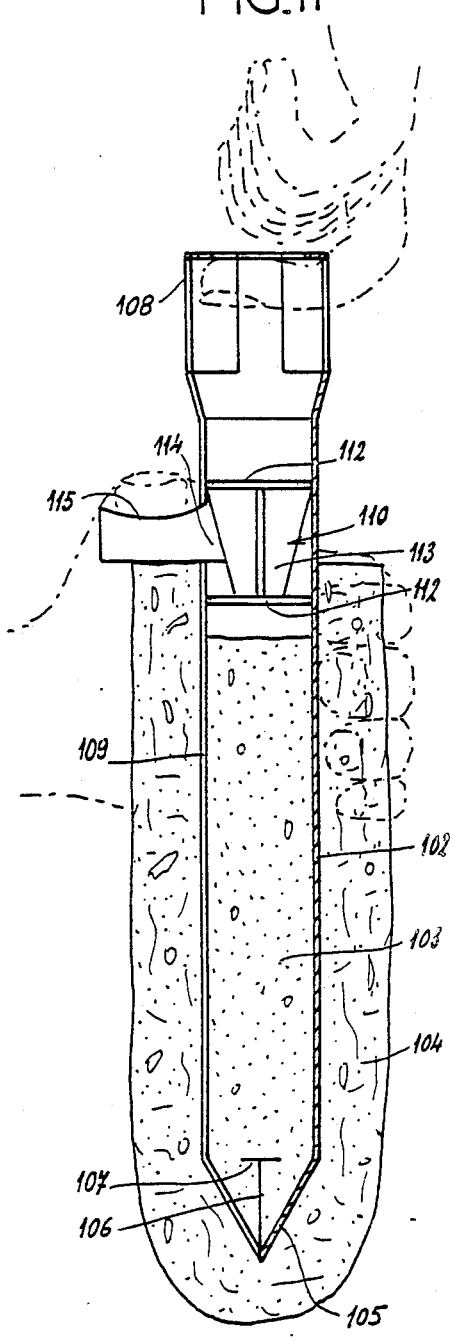
FIG. 11 is an axial section showing the use of the apparatus of FIGS. 8 through 10.

Thus with such a device the casing 116 is removed, the piston 110 inserted if necessary, and the tube 102 is poked into the bread 104 to the position shown in FIG. 11 with the pusher 115 bearing axially forward on the bread crust. Then a finger is hooked in the ring 108 while another finger, normally the thumb, is pressed down on the pusher surface 115, and the tube 102 is pulled out while the piston 11 slides forward. The increase in pressure in the mass causes the sides of the tip 105 to open up at the slits 106 and 107, permitting the filling 103 to exit into the bread.

In FIG. 12 a tube 119 has a forwardly conical and splittable tip 105 like that of FIGS. 8 through 11 and a rear end formed with a lateral pulling ring 108a and a flexible pulling handle 108b. A flexible but inextensible element, here a string 117, has a rear end attached to a plug 110a bearing backward against a forwardly facing sawtooth stop ridge 118 of the tube 110, and a front end extending past the front plug and out the tip 105. Such a tube 119 is poked completely through the bread 104. The free front end of the string 117 is then grasped and retained against movement while the tube 119 is withdrawn. The plug 110a cannot move, so the filling 103 passes out of the splittable tip 105 and into the bread 104. Thereafter the string 117 can be released at its front end and drawn backward out of the bread 104, simultaneously recovering the rear plug 110a if desired.

The tip 104a of FIGS. 13 and 14 is formed with an array of angularly equispaced longitudinal splits 106a that open at the tip. This divides the tip 105a up into a plurality of identical segments that can easily spread as shown in FIG. 4 when the tube is pulled back out of the bread it has been poked into.

I claim:

1. An apparatus for placing a flowable filling into a piece of bread of predetermined length and diameter to form a sandwich, the apparatus comprising:
   a tube of a diameter smaller than that of the piece of bread, of a length at least equal to that of the piece of bread, extending along a longitudinal axis, and having axially opposite front and rear ends, the tube being adapted to contain a batch of the filling between its ends, the front end being forwardly pointed, formed with longitudinal splits separating it into sections and allowing the front end to open, and normally plugging the tube in front of the filling; and
   a piston normally plugging the rear end of the tube and displaceable forward therein to open the front end and push the filling forward out through the splits of the open front end.

2. The sandwich-filling apparatus of claim 1 wherein the piston is formed with at least one axially throughgoing pore, whereby the piston can be pushed axially forward in the tube after filling of same with air trapped between the piston and the filling escaping through the pore.

3. The sandwich-filling apparatus of claim 1 wherein the rear end of the tube is rearwardly flared like a funnel, whereby the rear end can serve for pulling back the tube and for filling the tube.

4. The sandwich-filling apparatus of claim 1 wherein the tube is formed with lateral perforations, whereby pressures created by cooking can be relieved through these perforations.

5. The sandwich-filling apparatus of claim 4 wherein the perforations are at at least one of the ends of the tube.

6. The sandwich-filling apparatus of claim 1 wherein the rear end of the tube is outwardly flared, the apparatus further comprising:
   a frame having one end formed with a seat engageable around the tube ahead of and bearing axially back on the flared rear end and an opposite end axially behind the one end and forming a transverse pivot; and
   a rod having a front end carrying the piston and a rear end secured to the pivot, the rod being pivotal on the frame between a position lying on the axis with the piston in a tube in the seat and a position extending at an angle to the axis with the piston remote from the seat.

7. The sandwich-filling apparatus of claim 1 wherein the rear end is provided with a handle ring.

8. The sandwich-filling apparatus of claim 1 wherein the tube is provided with a tight forwardly closed casing surrounding it snugly axially in front of the piston and over the front end.

9. The sandwich-filling apparatus of claim 8 wherein the casing complementarily fits over the front tube end.

10. The sandwich-filling apparatus of claim 9 wherein the casing has a rear end attached to the tube.

11. The sandwich-filling apparatus of claim 1 wherein the tube is formed inside its rear end with a sawtooth ridge having a forwardly facing perpendicular flank bearing axially forward on the piston.

12. The sandwich-filling apparatus of claim 11, further comprising
   a flexible cord extending forwardly out of the tube through the front end thereof and having an end attached to the piston.

13. The sandwich-filling apparatus of claim 1 wherein the front end is conically forwardly pointed and centered on the axis.

14. The sandwich-filling apparatus of claim 1 wherein the front end is unitarily formed wiht the tube.

15. An apparatus for placing a flowable filling into a piece of bread of predetermined length and diameter to form a sandwich, the apparatus comprising:
   a tube of a diameter smaller than that of the piece of bread, formed with a laterally open longitudinal slot, of a length at least equal to that of the piece of bread, extending along a longitudinal axis, and having axially opposite front and rear ends, the tube being adapted to contain a batch of the filling between its ends, the front end being forwardly pointed, formed with longitudinal splits separating it into sections and allowing the front end to open, and normally plugging the tube in front of the filling; and
   a piston normally plugging the rear end of the tube, having a pusher projecting radially from the tube through the slot, and displaceable forward therein to open the front end and push the filling forward out through the splits of the open front end.

16. The sandwich-filling apparatus of claim 15 wherein the tube is formed with a pair of outwardly projecting and longitudinally extending lips flanking and defining the slot.

17. The sandwich-filling apparatus of claim 15 wherein the slot has sides and regions where its sides are spaced angularly alternating with regions where its sides bear resiliently angularly on each other.

* * * * *